US010917370B2

(12) United States Patent
Masterson et al.

(10) Patent No.: US 10,917,370 B2
(45) Date of Patent: *Feb. 9, 2021

(54) ELECTRONIC COMMUNICATION-BASED STORAGE OF DOCUMENTS TO SUPPORT MULTIPLE WORKFLOWS

(71) Applicant: Microsoft Technology Licensing, LLC, Redmond, WA (US)

(72) Inventors: Joseph Masterson, Maple Valley, WA (US); Jeremy de Souza, Bellevue, WA (US); Nathan Waddoups, Redmond, WA (US); Russell L. Simpson, Jr., Clyde Hill, WA (US); Michael B. Palmer, Edmonds, WA (US); Jin Ma, Redmond, WA (US); Elena Catrinescu, Woodinville, WA (US); Kenneth Fern, Bellevue, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/540,348

(22) Filed: Aug. 14, 2019

(65) Prior Publication Data

US 2019/0372922 A1 Dec. 5, 2019

Related U.S. Application Data

(63) Continuation of application No. 14/497,263, filed on Sep. 25, 2014, now Pat. No. 10,404,637.
(Continued)

(51) Int. Cl.
*H04L 12/58* (2006.01)
*G06F 3/0482* (2013.01)
(Continued)

(52) U.S. Cl.
CPC ............ *H04L 51/08* (2013.01); *G06F 3/0482* (2013.01); *G06F 3/04842* (2013.01);
(Continued)

(58) Field of Classification Search
CPC ....... H04L 51/08; H04L 51/02; H04L 51/046; H04L 12/1822; G06F 3/048–3/04897; G06Q 10/10; G06Q 10/107
See application file for complete search history.

(56) References Cited

U.S. PATENT DOCUMENTS

2010/0077050 A1* 3/2010 MacBeth ............. G06Q 10/107 709/206
2012/0179696 A1 7/2012 Charlot et al.
2014/0317210 A1* 10/2014 Song ........................ G06F 9/541 709/206

OTHER PUBLICATIONS

"Final Office Action Issued in Chinese Patent Application No. 201580018367.9", dated Dec. 4, 2019, 7 Pages.
(Continued)

*Primary Examiner* — David S Posigian
(74) *Attorney, Agent, or Firm* — Merchant & Gould

(57) ABSTRACT

Electronic communication-based storage of content items to support multiple workflows is provided. When an attached content item is received with an electronic communication, a receiving user may select the attached content item for review and editing in an immersive view pane that may be launched adjacent to or in proximity to an electronic mail viewing pane. When the received content item is edited, a copy of the edited content item is temporarily stored with the electronic communication with which the content item was received at an associated electronic communication server. When the receiving user then desires to dispose of the edited content item, for example, by replying back to the sending user with the edited content item as an attachment, the edited content item may be retrieved from the electronic commu-
(Continued)

nication server automatically for attachment to the responsive communication.

20 Claims, 11 Drawing Sheets

Related U.S. Application Data

(60) Provisional application No. 61/973,101, filed on Mar. 31, 2014.

(51) Int. Cl.
*G06F 3/0484* (2013.01)
*G06Q 10/10* (2012.01)
*H04L 12/18* (2006.01)

(52) U.S. Cl.
CPC .......... *G06Q 10/107* (2013.01); *H04L 51/02* (2013.01); *H04L 51/046* (2013.01); *H04L 12/1822* (2013.01)

(56) References Cited

OTHER PUBLICATIONS

"Final Office Action issued in U.S. Appl. No. 14/497,281", dated Jan. 30, 2020, 19 Pages.
"Office Action Issued in Indian Patent Application No. 201647031704", dated Feb. 21, 2020, 8 Pages.
"Non Final Office Action Issued in U.S. Appl. No. 14/497,281", dated Aug. 5, 2019, 15 Pages.
"Second Office Action Issued in Chinese Patent Application No. 201580018358.X", dated Aug. 22, 2019, 5 Pages.
"Second Office Action Issued in Chinese Patent Application No. 201580018360.7", dated Apr. 19, 2019, 9 Pages.
"Second Office Action Issued in Chinese Patent Application No. 201580018367.9" dated Aug. 9, 2019, 6 Pages.
"Summons to Attend Oral Proceedings Issued in European Patent Application No. 15715090.5", Mailed Dated: May 4, 2020, 9 Pages.
"Summons to Attend Oral Proceedings Issued in European Patent Application No. 15716277.7", Mailed Date: May 15, 2020, 9 Pages.
"Non Final Office Action Issued in U.S. Appl. No. 14/497,281", dated May 8, 2020, 19 Pages.
"Final Office Action Issued in U.S. Appl. No. 14/497,281", dated Nov. 5, 2020, 25 pages.

* cited by examiner

ELECTRONIC COMMUNICATION-BASED STORAGE OF DOCUMENTS TO SUPPORT MULTIPLE WORKFLOWS

CROSS-REFERENCE TO RELATED APPLICATIONS

This application is a continuation of U.S. patent application Ser. No. 14/497,263, filed Sep. 25, 2014, now U.S. Pat. No. 10,404,637, which in turn claims priority to U.S. Provisional Patent Application Ser. No. 61/973,101, filed Mar. 31, 2014, the entire contents of each of which are included herein by reference.

BACKGROUND

Computer and computer software users have become accustomed to generating, editing, receiving and sending many types of content items, for example, documents of different types, photographs, images, electronic mail items, calendaring items, notes items, and the like. In a typical electronic mail setting, a user often attaches a document or other content item (hereafter referred to as "attachment" or "content item") to an electronic mail item he/she then sends to a receiving user for review or editing. The receiving user then typically downloads the received attachment to her local computing device or to an enterprise (local or remote) storage depository, for example, a company or school file server or a remote server at which the receiving user has a storage location or at a collaborative file storage location at which the sending user and the receiving user store content items for receiving and editing as part of a collaborative work group of any of a number of types.

If the receiving user edits the attachment, he/she typically saves the edited attachment content item to the storage location (described above). When the receiving user then desires to reply back to the sending user with the edited attachment or desires to send the edited attachment to other users or desires to add the edited attachment to a calendar entry, task entry, notes entry, meeting request, or the like, the receiving (and editing) user must locate the edited content item at the storage location and must attach the edited content item to the appropriate communication medium (e.g. email, text message, instant message, video conference, calendar entry, notes entry, task entry, meeting request, etc.). For example, the receiving user may then attach the edited content item to a reply email that may be sent back to the sending user for review. Such a receive, store, edit, store, retrieval, attachment, disposition process is time consuming, memory consuming, process consuming and typically frustrating to users. It is with respect to these and other considerations that the present invention has been made.

SUMMARY

This summary is provided to introduce a selection of concepts in a simplified form that are further described below in the detailed description. This summary is not intended to identify key features or essential features of the claimed subject matter, nor is it intended as an aid in determining the scope of the claimed subject matter.

Embodiments of the present invention solve the above and other problems by providing electronic mail-based storage of content items to support multiple workflows. When an attached content item is received with an electronic communication (e.g., an electronic mail, text message, instant message, chat message, video message, and the like), a receiving user may select the attached content item for review and editing in an immersive view pane that may be launched adjacent to or in proximity to an electronic mail viewing pane. If the receiving user desires to edit the received content item, functionality associated with the received content item, for example, word processing functionality, may be provided in the immersive view pane for allowing the receiving user to edit the received and viewed content item. When the received content item is edited, a copy of the edited content item is temporarily stored with the electronic communication with which the content item was received at an associated electronic communication server. When the receiving user then desires to dispose of the edited content item, for example, by replying back to the sending user with the edited content item as an attachment, then the edited content item may be retrieved from the electronic communication server automatically for attachment to the responsive communication. According to embodiments, the temporarily stored edited content item may be utilized according to a variety of functionalities. For example, the edited content item may be sent to a variety of users, may be added to a calendaring item, may be added to a meeting request, may be inserted to a notes application document, and the like.

The details of one or more embodiments are set forth in the accompanying drawings and description below. Other features and advantages will be apparent from a reading of the following detailed description and a review of the associated drawings. It is to be understood that the following detailed description is explanatory only and is not restrictive of the invention as claimed.

DESCRIPTION OF THE DRAWINGS

FIG. 2A illustrates a computer-generated user interface of an electronic mail application with which embodiments the present invention practiced.

FIG. 2B illustrates a computer-generated user interface of an electronic mail application with an immersive view pane in which a received content item may be displayed for viewing.

FIG. 2E illustrates a computer-generated user interface of an electronic mail application and showing attachment of an edited content item for disposition according to embodiments of the present invention.

DETAILED DESCRIPTION

Figure 1:
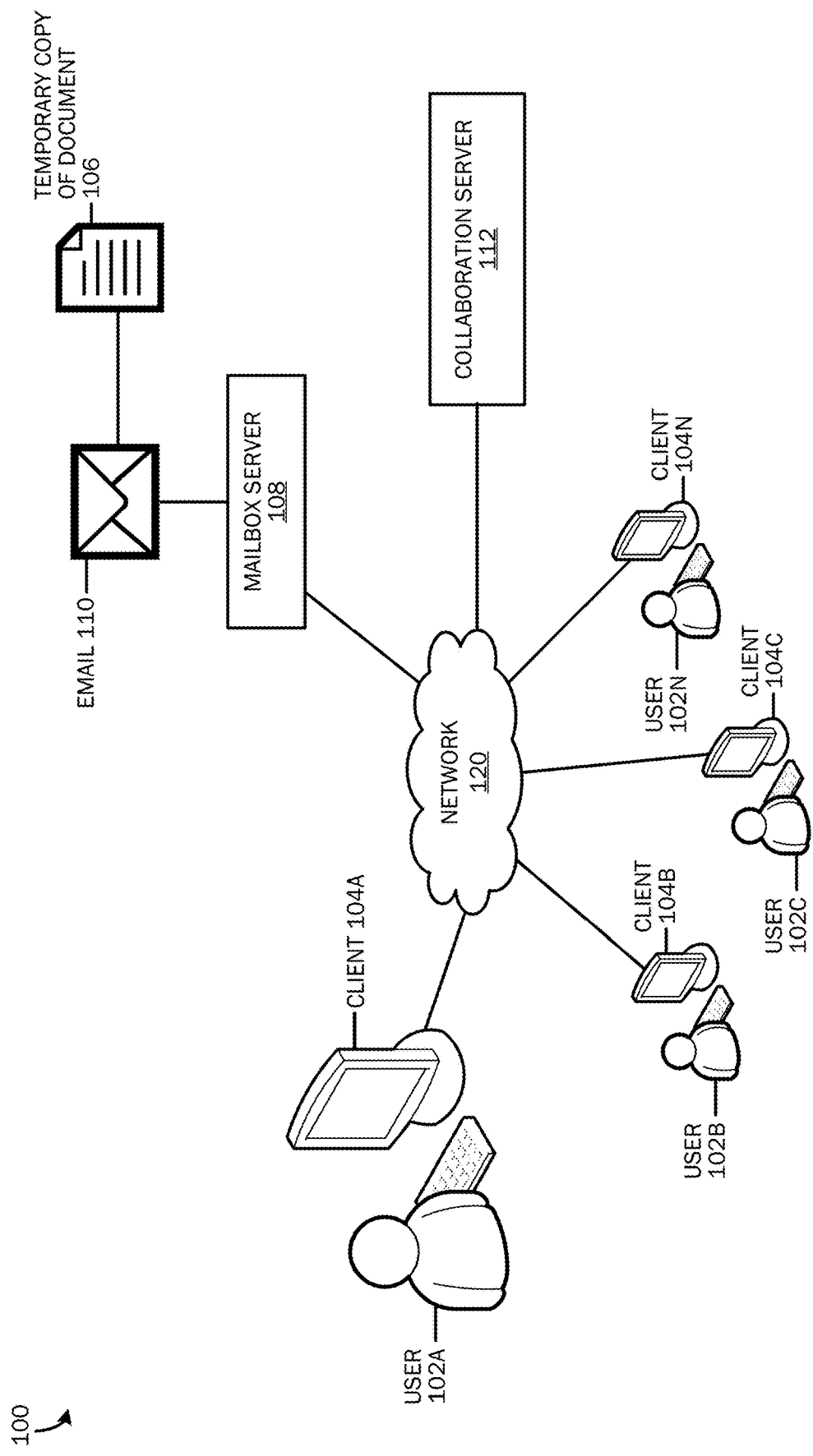
FIG. 1 is simplified block diagram illustrating a system for electronic communication-based storage and use of documents and other content items to support multiple workflows.

The following detailed description refers to the accompanying drawings. Wherever possible, the same reference numbers are used in the drawings and the following description to refer to the same or similar elements. While embodiments of the invention may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the invention, but instead, the proper scope of the invention is defined by the appended claims.

As briefly described above, embodiments of the present invention are directed to electronic communication-based storage of documents and other content items to support multiple workflows, such as electronic mail workflows, calendaring workflows, tasks and reminder workflows, notes taking workflows, document and other content editing workflow, and the like. When an attached content item (e.g., document, image, file, etc.) is received with an electronic communication message (e.g., electronic mail, text message, instant message, chat message, videoconference message, and the like), a receiving user may select the attached content item in the received email message. Upon selection, the attached content item may be opened in an immersive view pane to allow the receiving user to view or read the content item. The immersive view pane may be displayed adjacent to an electronic communication view pane or canvas in a right/left, left/right, top/bottom, or bottom/top orientation to allow the receiving user to view both the open content item in the immersive view pane and an associated electronic communication item or communication conversation thread of items in an electronic communication view pane simultaneously.

Alternatively, the immersive view pane may be displayed over an entirety of a computer display surface if the display surface is not large enough to display both the immersive view pane and the electronic communication pane simultaneously. If the receiving user selects the content item for editing, functionality of a software application associated with the content item (e.g., where processing functionality, spreadsheet application functionality, slide presentation application functionality, electronic notes taking application, database application functionality, image editing and/or processing application functionality, desktop publishing application functionality, and the like) may be provided in the immersive view pane for allowing the user to edit the content item according to the functionality of an appropriate software application.

When the user begins to edit the content item in any way, for example, adding or removing characters, adding or removing spaces, adding or removing carriage returns, and the like, a temporary copy of the edited content item is stored with the received electronic communication item at an associated electronic communication server or other storage repository. According to one embodiment the temporarily stored edited content item may be renamed to distinguish it from the originally received content item. For example, the edited content item may be renamed to include the original filename for the received content item and to include an identification of the editing user such that subsequent receiving users may know the identity and other information associated with edits to the content item.

The receiving user may then communicate the temporarily stored edited content item according to a variety of means. For example, the receiving user may reply back to the sending user with the edited content item as an attachment, the receiving user may send the edited content item to one or more other users or groups of users. The receiving user may attach the edited content item to a meeting request, calendar item, electronic note, electronic task, electronic reminder, or the like. In addition, the editing user may store the edited content item in a storage repository apart from the electronic mail message and associated storage if the editing user determines that the edited content item is ready for storage as would be the case with any other edited content item that is to be stored for subsequent use. Thus, the need to manually save the received content item to a storage location, save edits to the stored content item, retrieve the edited content item, dispose of the retrieved edited content item, etc. is avoided.

FIG. 1 is simplified block diagram illustrating a system 100 for electronic communication-based storage and use of documents and other content items to support multiple workflows. As Illustrated in FIG. 1, a variety of users 102*a*, 102*b*, 102*c*, 102*n* are illustrated in association with respective client devices 104*a*, 104*b*, 104*c*, 104*n*. The users and the associated client devices are illustrative of one or more users who may generate, edit, receive, send, or otherwise interact with content items of various types as described herein. The client devices 104*a*-104*n* are illustrative of a variety of computing devices, for example, desktop computing devises, laptop computing devices, tablet computing devices, handheld computing devices (mobile phones), and the like. Each of the example computing devices may be interacted with according to a variety of input means, for example, keyboard input, mouse input, electronic pen and ink input, touch input, gesture input, voice input, eye tracking input, and the like. At each of the client devices 104*a*-104*n*, a variety of software applications may be provided for allowing the one or more users to interact with a variety of content items. For example, software applications such as electronic mail applications, word processing applications, slide presentation applications, spreadsheet applications, notes taking applications, desktop publishing applications, calendaring applications, image processing and editing applications, and the like may be operated at the client devices by the one or more users 102*a*-102*n*. The network 120 is illustrative of an enterprise-based network, for example, an intranet, or a distributed computing network, for example, the Intranet, over which the various users may communicate with each other and with other computing systems, as described herein.

The mailbox server 108 is illustrative of an electronic communication system that may be located local to one of the various users, or that may be located remotely from the various users for allowing electronic mail and other electronic communications between the various users. An example of a server 108 may be an EXCHANGE server from Microsoft Corporation. The electronic communication item 110 (e.g., email item) is illustrative of an electronic communication that may be communicated between one or more users for passing text-based communications, and a variety of attached files, for example, audio files, text files, image files, data files, and the like. The temporary copy of a document 106 is illustrative of a temporary storage of an edited attached content item that is edited in association with an electronic communication item and that is temporarily stored with an electronic communication at the electronic mail server 108 for disposition according to embodiments of the present invention. The collaboration server 112 is illustrative of a local or remote storage repository at which one or more content items may be stored. For example, the collaboration server 112 may be a shared resources server located at an enterprise accessible by the various users, or may be remotely located from the various users at which the various users may store and collaborate on various documents. An example of such a collaboration server 112 may include a SHAREPOINT server or ONEDRIVE server from Microsoft Corporation.

According to embodiments of the present invention, when an attached content item is received and edited by a given user, a temporary copy 106 of the edited content item is stored with the received electronic communication item 110 at the electronic communication server 108. The content item is only stored at the collaboration server 112 if a given user desires to store the received content item apart from the electronic communication server 108 as described with respect to embodiments illustrated and described herein.

Figure 2A:
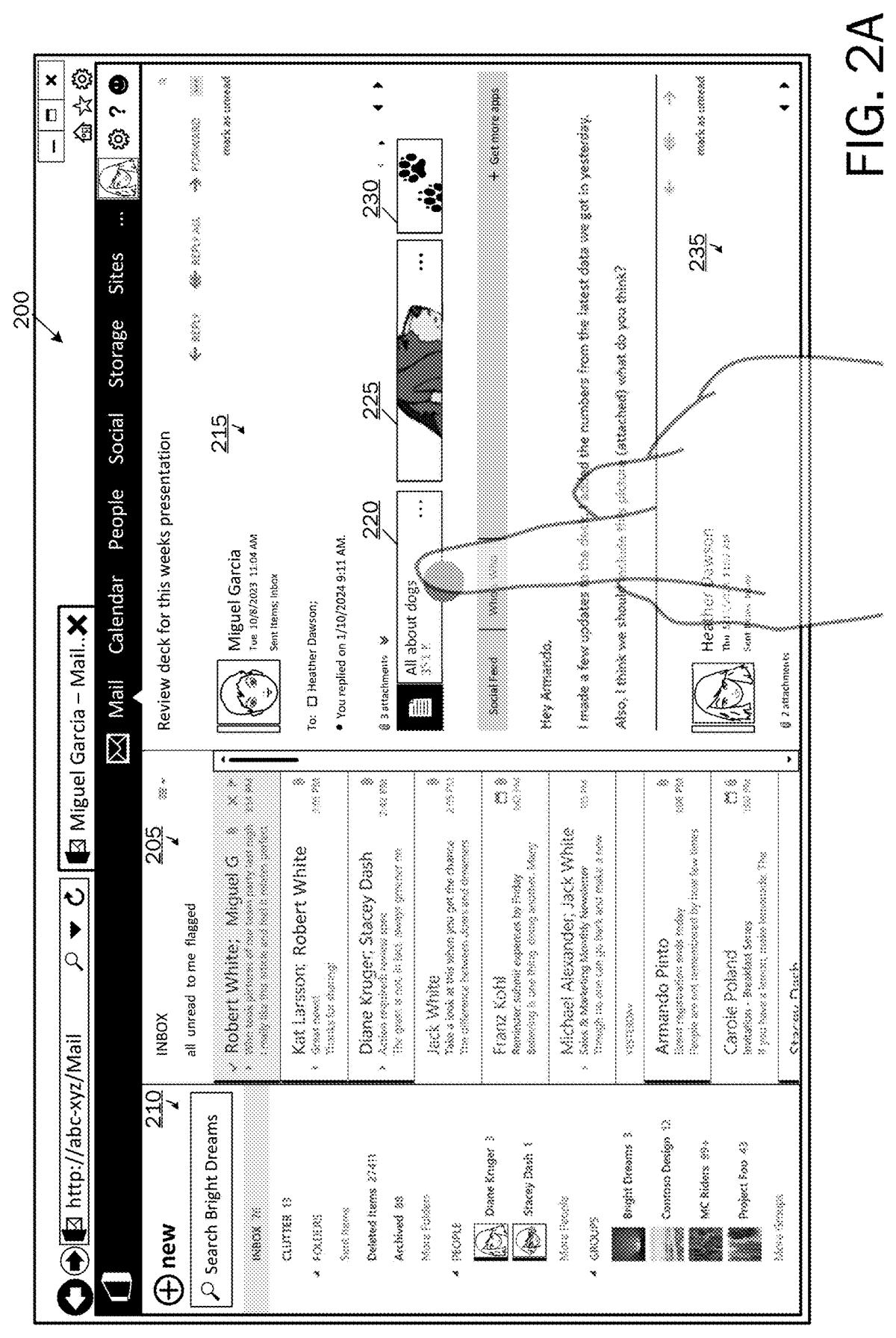

FIG. 2A illustrates a computer-generated user interface of an electronic communication application with which embodiments the present invention practiced. An example electronic communication application suitable for embodiments described herein includes OUTLOOK from Microsoft Corporation. As illustrated in FIG. 2A, a user interface 200 for an example electronic mail application with which a user may send and receive a variety of electronic messages, and with which a user may send and receive content item attachments according to embodiments of the present invention is illustrated. An electronic mail folder pane 210 is illustrated on the left side of the user interface 200 in which a variety of folders, contact items, group items, calendar items, and the like, may be provided to allow a user to select various folders, contacts, or other items associated with her electronic communication application functionality. An electronic communication items folder 205 is illustrated in which a variety of electronic communication items received by the receiving user are displayed that may be selectively reviewed and responded to according to the functionality of the associated electronic communication application. For example, the pane 205 may include an inbox for listing all received electronic mail items, a sent box for listing sent electronic mail items and/or the contents of a given folder of electronic communication items.

On the right side of the example user interface 200 is displayed an electronic mail viewing pane in which a given electronic communication message or electronic communication conversation thread of items may be displayed for allowing a user to read or otherwise interact with a given electronic communication message, for example, replying to the message, forwarding the message, and the like. That is, upon selection of a given communication item (e.g., an electronic mail item) listed in an inbox displayed in the pane 205, the selected item may be opened in the pane 215 to allow the user to read or respond to the communication item. If the selected communication item contains a thread of multiple communication items comprising a communication conversation, then the entire thread of items may be displayed in the pane 215 to allow the user to navigate through the various items in the thread.

As illustrated in FIG. 2A, an example electronic mail message 235 has been received by the receiving user and has been opened in the electronic communications pane or canvas 215. The received electronic mail message includes three example attachments 220, 225, 230. As should be appreciated, the attachments 220, 225, 230 are illustrative of any attached content item, for example, a word processing document, a spreadsheet document, a slide presentation document, a notes document, an image file, a photograph, and the like, that may be received by the receiving user from a sending user.

According to embodiments of the present invention, if a user selects one of the attached content items 220, 225, 230, the selected content item may be displayed in an immersive view pane 237 for allowing a user to view and/or edit the selected content item. As illustrated in FIG. 2A, an example user selects the example word processing document attachment icon 220 for viewing and interacting with the selected document 220, as described herein.

Figure 2B:
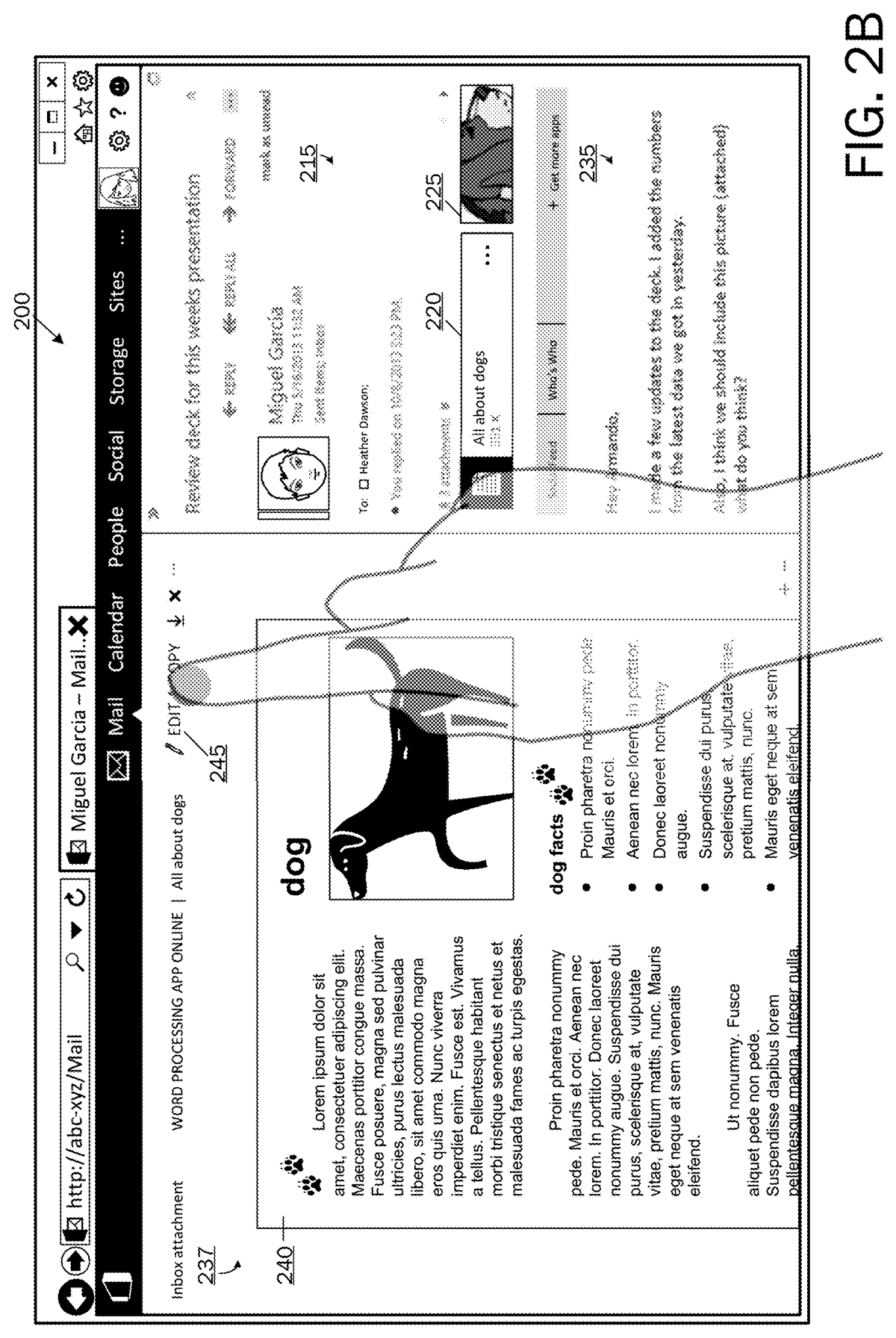

Referring now to FIG. 2B, in response to the receiving user's selection of the attachment item 220, as illustrated in FIG. 2A, the associated document 240 is automatically displayed in an immersive view pane 237 for allowing the user to review and interact with the associated document 240. As illustrated in FIG. 2B, the immersive view pane is positioned on the left side of the user interface 200, and the electronic mail view pane 215 remains displayed on the right side of the user interface 200. As should be appreciated, the respective viewing panes may be displayed in other orientations, for example in a right/left orientation where the immersive view pane is displayed on the right side of the user interface and the electronic mail pane is displayed on the left, a top/bottom orientation where the immersive view pane is displayed on the top of the interface 200 and the electronic communication pane is displayed on the bottom of the interface 200, or a bottom/top orientation where the immersive view pane is displayed on the bottom of the interface 200 and the electronic communication view pane is displayed on a top of the interface 200. Alternatively, if the computing device in use by the receiving user is a small form device, such as a tablet computing device or mobile phone, and display space is insufficient for displaying both the immersive view pane and the electronic communication view pane, then the immersive view pane 237 may be displayed over the entire display surface of the computing device, and a functionality button or control may be provided for selectively returning the electronic communication view pane to display, as desired. Alternatively, a truncated display of the electronic communication view pane may be provided and the remaining display space may be used for the immersive view pane.

Referring still to FIG. 2B, an edit/copy function 245 is provided for allowing the user to selectively edit the document 240 displayed in the immersive view pane. That is, as will be described below, selection of the edit/copy function 245 may cause a provision of functionality associated with the document 240 to allow the user to edit the document 240 in association with the provided functionality. As should be appreciated, the edit/copy function 245 is illustrative of one of a variety of functions that may be provided in the immersive view pane for allowing a user to operate on the document displayed in the immersive view pane. For example, other functions that may be provided may include a send function for allowing the user to send the document 240 to another user, a save function for allowing a user to save the document to a storage location such as the collaboration server 112, described above, and the like.

Figure 2C:
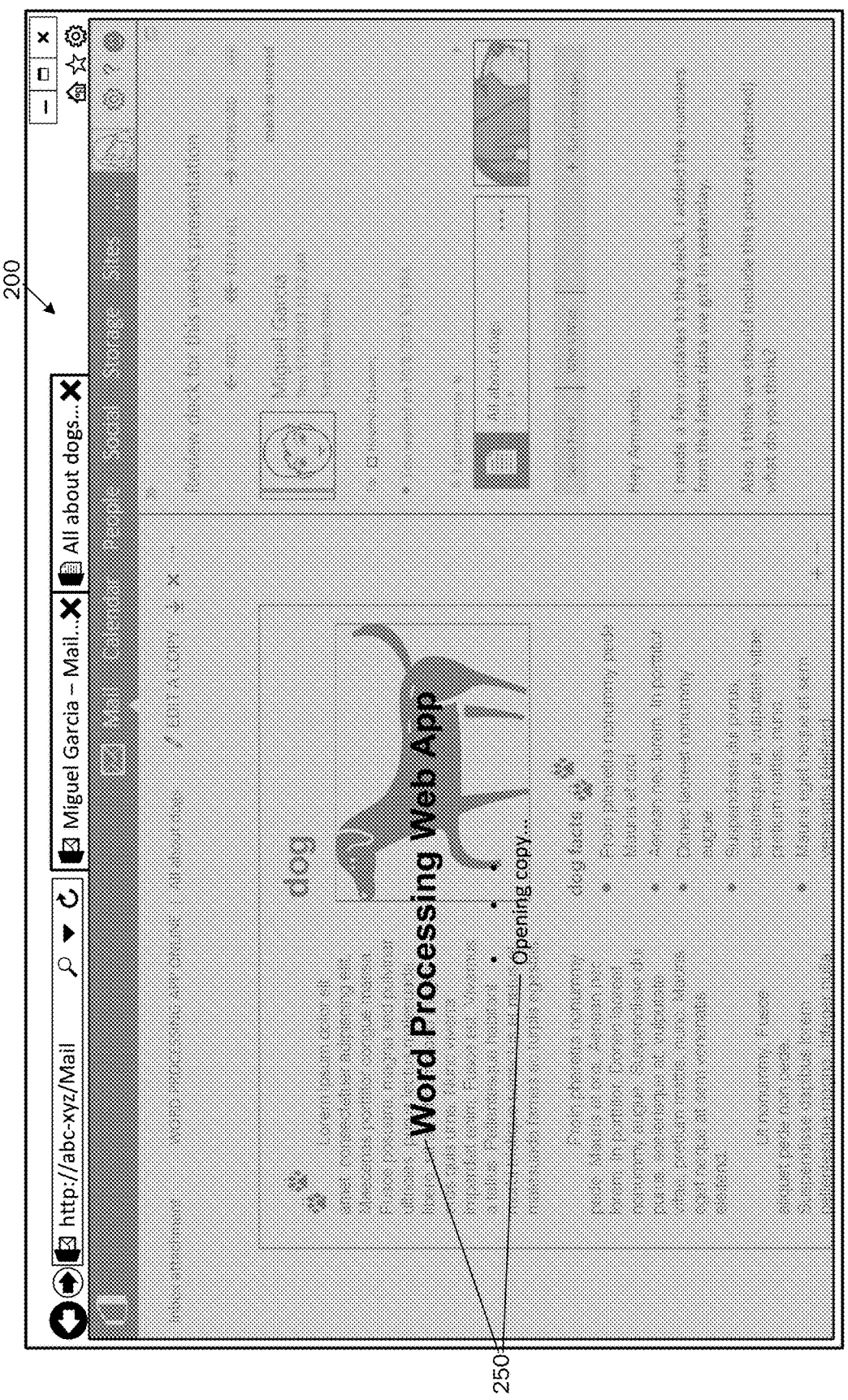
FIG. 2C illustrates a computer-generated user interface of an electronic mail application with an immersive view pane and showing a launching of a software application associated with a received content item.

According to embodiments of the present invention, if a user selects the edit/copy function 245, an application associated with the content item type for the content item displayed in the immersive view pane may be launched in the immersive view pane as illustrated in FIG. 2C. In FIG. 2C, a word processing web-based application 250 is launched in response to a selection of an edit/copy function for the document displayed in the immersive view pane, as illustrated in FIG. 2B. That is, if the document 240 is a word processing application, then selection of an edit function associated with the document 240 may cause the launching and retrieval of word processing functionality for allowing a user to edit the document in association with application functionality with which the document was created. For example, if the document 240 is a spreadsheet document, then selection of an edit function 245 may cause the launching of spreadsheet application functionality in the immersive view pane. Likewise, if the document 240 is a slide presentation, then selection of an edit function 245 may cause the launching and provision of slide presentation application functionality in the immersive view pane for use with the document displayed in the immersive view pane. As illustrated in FIG. 2C, a web-based application 250 is launched in response to the selection of an edit/copy function 245, but as appreciated, a local or remote word processing application may similarly be launched for providing functionality in association with the document 245.

Figure 2D:
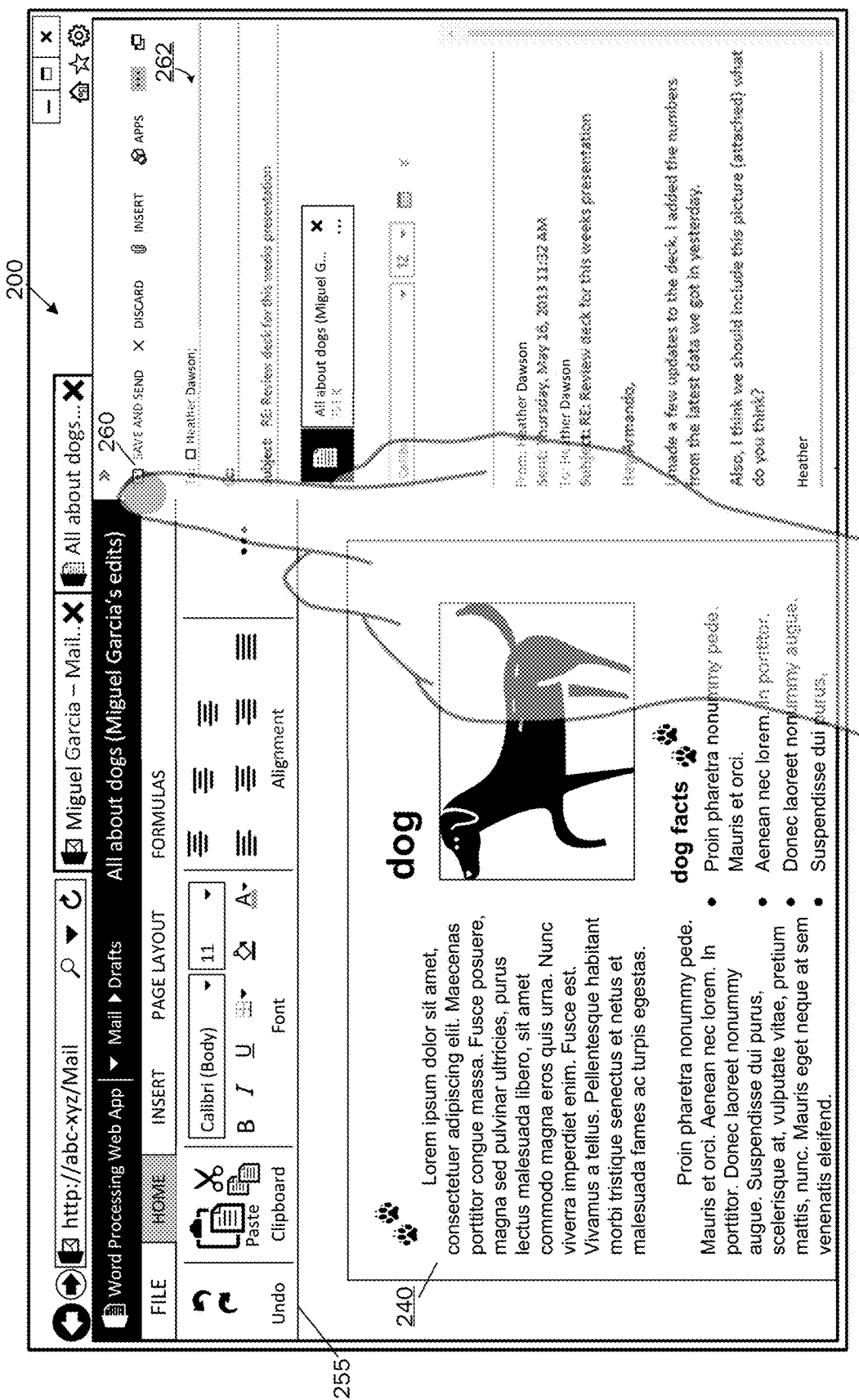
FIG. 2D illustrates a computer-generated user interface of an electronic mail application with an immersive view pane and showing a display of software application functionality for allowing editing of a received content item.
Figure 3:
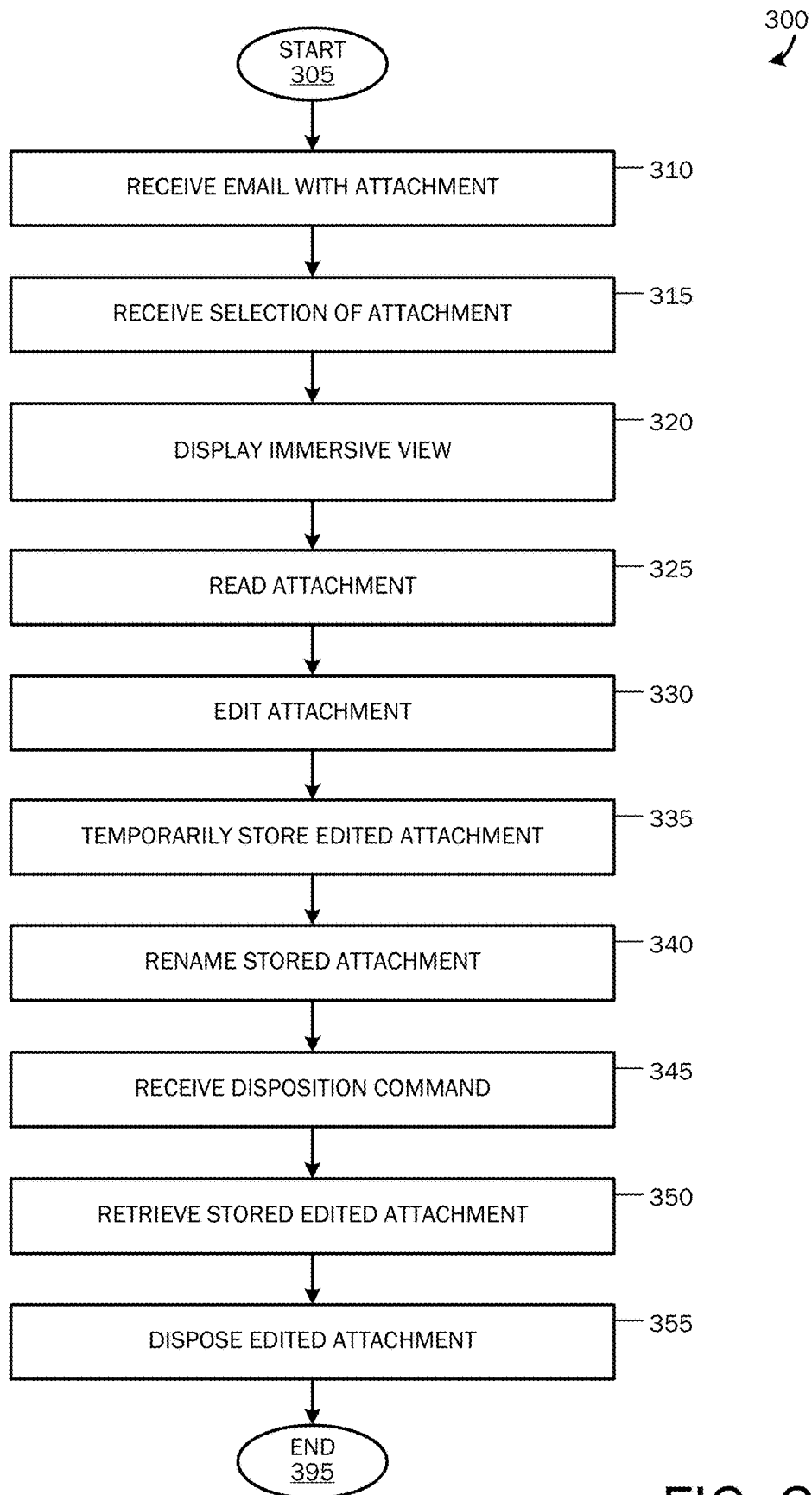
FIG. 3 is a flow diagram illustrating a method for electronic communication-based storage of documents to support multiple workflows.

As illustrated in FIG. 2D, in response to a selection of an edit/copy function 245, as illustrated in FIG. 2B, and in response to a launching of an associated example word processing application, as illustrated in FIG. 2C, a variety of word processing functionalities 255 may be provided in the immersive view pane for allowing the receiving user to edit the document 240. As should be appreciated, an instance of a word processing application may be launched and displayed in the immersive view pane, or selected functionalities, for example, formatting functionalities may be provided in the immersive view pane for allowing a user to operate certain word processing functions on the document 240. Likewise, if the document 240 is a spreadsheet document, then an instance of a spreadsheet application may be launched in the immersive view pane, or certain functionalities of a spreadsheet application may be provided in the immersive view pane.

Referring still to FIG. 2D, the functionalities 255 provided in the immersive view pane provide for various word processing application functions that may be applied to the document 240 by the receiving user in an effort by the receiving user to edit the received attachment (e.g., attached word processing document). As should be appreciated, if the user desires to edit a portion of the document 240 not associated with the example word processing application, for example, the photograph of a dog contained in the document 240, then functionalities required for editing an image such as the photograph of the dog may be provided to allow the user to edit the image.

Referring still to FIG. 2D, according to one embodiment, when the receiving user selects the document 240 for editing, a draft communication, for example, a draft reply electronic mail item 262 may be automatically generated and displayed in the electronic communication view pane to allow the user to communicate the edited document or other content item when the user completes the editing process. Referring to the draft communication 262, according to one embodiment, an automatic reply message to the original sender of the electronic mail message that attached the document 240 that is being edited by the receiving user may be generated so that upon completion of edits to the document 240, the editing user may select a save and send function 260 for automatically attaching the edited version of the document or content item 240 to the draft communication 262 for sending the communication to the original sending user. Thus, a communication from the sending user to the receiving user is enabled where the receiving user opens an attachment received from the sending user, edits the attachment and automatically sends the edited version of the attachment back to the original sending user without the need for saving the attachment to a hard drive or other storage repository at which edits are made and saved followed by a retrieval and re-attachment of the edited content item to a communication for transmitting to the original sending user.

Referring now to FIG. 2E, if the receiving user selects the save and send function 260, then the user interface 200 for the example electronic mail application is returned back to a state wherein the folders pane 210, the electronic communication items pane 205, and the electronic communication view pane 215, are presented, but where a reply communication 265 is illustrated with which the user may send an attachment 270 of the edited version of the originally received attachment back to the original sending user. As should be appreciated, the receiving user may enter one or more text strings such as the string "I've made some changes. Let me know what you think.", or with which the user may attach one or more additional documents or other content items for sending to the original sending user.

As described above with reference to FIG. 1, when the user begins the editing process for an attached content item, as illustrated in FIG. 2D, a temporary copy of the content item being edited is saved along with the received electronic communication item 110 at the electronic communication server 108. According to one embodiment, the edited attachment is renamed to provide information to an individual recipient of the edited document and to distinguish the edited document from a previous version of the edited document. For example, a document with a file name of "Document A" may be renamed to include a name or other identification for the editing user and a new name of "Document A.editing user" may be applied to the edited version of the attached content item, and the renamed and edited version of the content item may be stored as a temporary copy of the document 106 at the electronic communication server 108, as illustrated in FIG. 1. Thus, the edited version of the content item is not stored at a separate local or remote storage area, such as the collaboration server 112 from which the edited version of the content item must be retrieved for eventual communication to another user.

Referring still to FIGS. 1 through 2A, sending of an edited version of an attached content item back to the original sending user is illustrated and described. Alternatively, according to embodiments, other functionality of the electronic communication application may be utilized for disposing of an edited version of the received attached content item. For example, instead of using a save/send function 260, as illustrated in FIG. 2D, another function such as "send as meeting request" may be provided which, when selected, causes an automatic generation of a meeting request and an automatic attachment of the edited content item to the meeting request. Likewise, another function, such as, "add to notes" may be provided, which when selected, causes an automatic presentation of a notes user interface component in the electronic communication view pane and automatically attaches an edited version of the attached content item to an electronic notes document. Another function, such as, "add to calendar entry" may be provided, which when selected, causes an automatic opening of a calendar function and an automatic attachment of the edited version of the content item to a calendar item in an associated electronic calendaring application. As should be appreciated, any number of functions may be provided similar to the save and send function 260 which when selected may cause the provision of a user interface component in the electronic communication view pane for automatically attaching the edited version of the attached content item to another content item associated with a selected functionality.

Having described a system architecture, various user interface components and various aspects of embodiments in the present invention with respect to FIGS. 1 through 2E, FIG. 3 is a flow diagram illustrating a method for electronic communication-based storage of documents to support multiple workflows. The routine 300 begins at start operation 305 and proceeds to operation 310 where a user receives an electronic mail item from a sender where the electronic mail item includes one or more attached content items. As should be appreciated, if a received electronic mail item includes more than one attached content item, each of the attached content items may be interacted with, including editing as described above, and each interacted-with attached content item may be disposed of through one or more communications means, as described above.

At operation 315, the receiving user selects a given attached content item for viewing and/or editing. At operation 320, the user interface 200 of the receiving user's electronic mail application is transitioned such that an immersive view pane is provided, as illustrated in FIG. 2B, and the selected attachment content item, for example, a document, image, dataset, and the like, is displayed in the immersive view pane to allow the receiving user to view and/or interact with the selected content item. At operation 325, the receiving user may desire to only view or read the selected attachment, and after the user finishes reading or viewing the selected attachment, the immersive view pane may be dismissed, and the electronic communication application user interface 200 may be returned to a starting state as illustrated in FIG. 2A.

At operation 330, if the receiving user decides to edit the displayed attached content item, the user may select a function such as the edit/copy function 245 illustrated in FIG. 2B for causing a provision of editing functionality associated with an application that is associated with the content item type of the content item interacted-with by the user. For example, if the attached content item interacted with by the user is a word processing document, then word processing functionality may be provided in the immersive view pane, as described above. As should be appreciated, instead of requiring the selection of a functionality control 245, associated document or content item functionality may be provided automatically in response to an indication that the user intends to interact with the content item, for example, where the user taps on, mouse clicks, electronic pen touches, or otherwise, interacts with the displayed content item.

In either case, when the user selects the edit function 245, indicates an intention to edit the content item or begins a first edit to the displayed document, for example, adds or deletes a character, adds or deletes a space, adds or deletes a character term, and the like, the routine 300 proceeds to operation 335, and a temporary copy 106 of the attached content item is automatically generated and is temporarily stored with the received electronic communication message at the electronic communication server 108, as illustrated and described above with reference to FIG. 1. At operation 340, according to one embodiment, the temporarily-stored edited version of the attached content item is renamed to distinguish the originally received version of the content item.

According to one embodiment, as described above, when the user begins the editing process, in addition to temporarily storing the edited version of the content item, a draft communication, for example, a draft reply email, a draft forwarding email, and the like, is automatically generated and is automatically displayed in the electronic communication view pane for allowing the user at operation 345 to quickly reply back to the sending user or forward the email to another one or more users and automatically attach the edited version of the content item to the draft communication for sending as desired.

At operation 350, when the receiving user selects a functionality for sending the edited version of the originally received content item to another user, or to another application functionality, for example, a calendaring function, a notes-taking function, a meeting request function, and the like, the temporarily-stored edited version of the content item is retrieved from the server 108 for attachment to the desired communication for communicating or transmitting the edited version of the content item as desired.

At operation 355, if the edited version of the originally received content item is sent to one or more other users, then the one or more other users may selected the edited version, and those one or more users may then edit the edited version for sending their edited version back to the sender or back to other users as described above. Thus, the attached document may be edited and re-edited over and over between various users without the need for ever saving the document to a hard drive or other storage repository at which edits may be received and stored and from which the edited content item may be later retrieved for disposition, as described herein. That is, according to embodiments of the present invention, the editing and re-editing process may all take place in association with the electronic communication (e.g., email) and the electronic communications functionality and server. According to one embodiment, if at any given time one or more users desires to store a received version of the attached content item, then they may send the attached content storage medium at a computing device hard drive, or at a local or remote storage repository such as the collaboration server 112, illustrated and described above with reference to FIG. 1. The routine 300 ends at operation 395.

While the invention has been described in the general context of program modules that execute in conjunction with an application program that runs on an operating system on a computer, those skilled in the art will recognize that the invention may also be implemented in combination with other program modules. Generally, program modules include routines, programs, components, data structures, and other types of structures that perform particular tasks or implement particular abstract data types.

The embodiments and functionalities described herein may operate via a multitude of computing systems including, without limitation, desktop computer systems, wired and wireless computing systems, mobile computing systems (e.g., mobile telephones, netbooks, tablet or slate type computers, notebook computers, and laptop computers), hand-held devices, multiprocessor systems, microprocessor-based or programmable consumer electronics, minicomputers, and mainframe computers.

In addition, the embodiments and functionalities described herein may operate over distributed systems (e.g., cloud-based computing systems), where application functionality, memory, data storage and retrieval and various processing functions may be operated remotely from each other over a distributed computing network, such as the Internet or an intranet. User interfaces and information of various types may be displayed via on-board computing device displays or via remote display units associated with one or more computing devices. For example user interfaces and information of various types may be displayed and interacted with on a wall surface onto which user interfaces and information of various types are projected. Interaction with the multitude of computing systems with which embodiments of the invention may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

Figure 4:
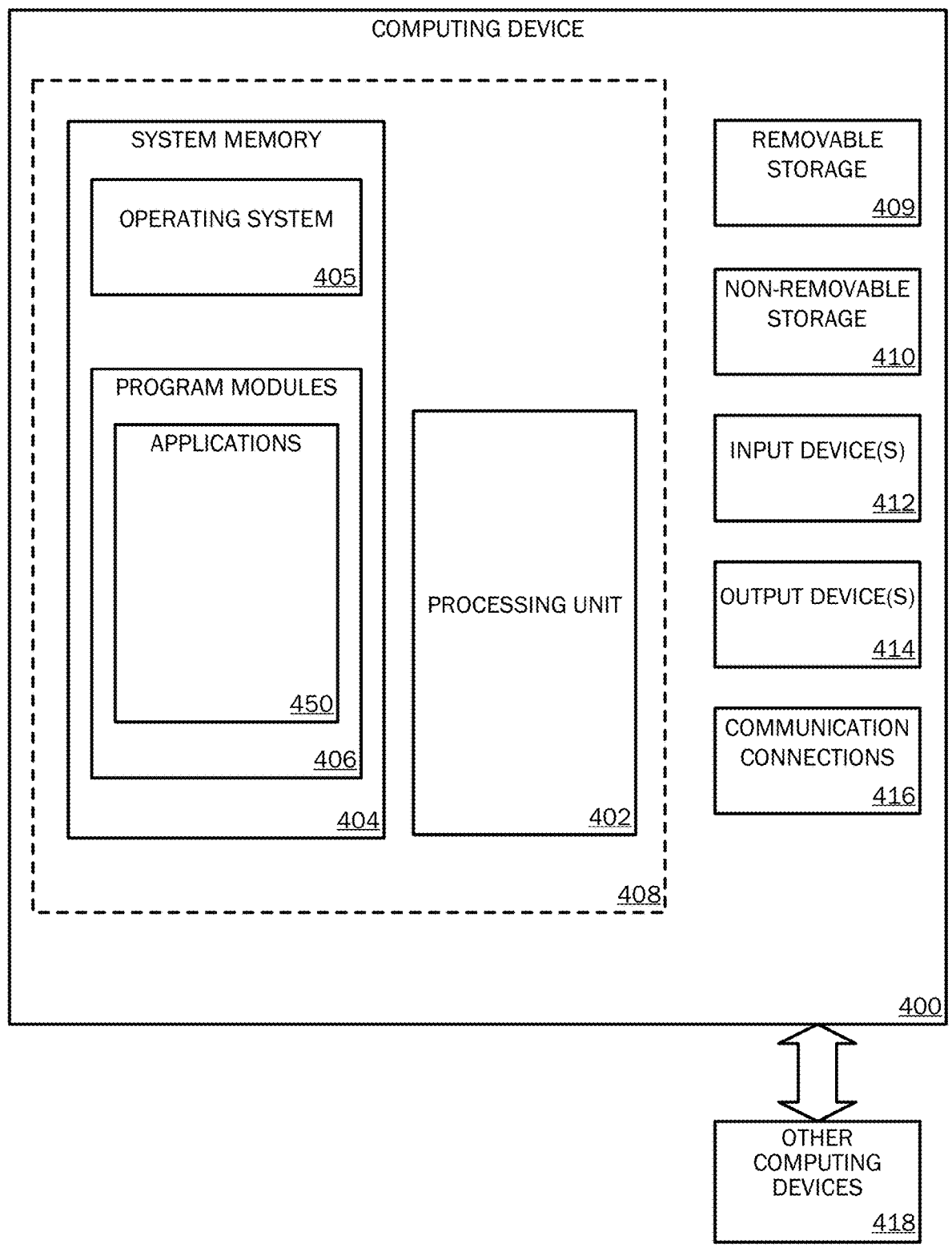
FIG. 4 is a block diagram illustrating example physical components of a computing device with which embodiments of the invention may be practiced.
Figure 5A:
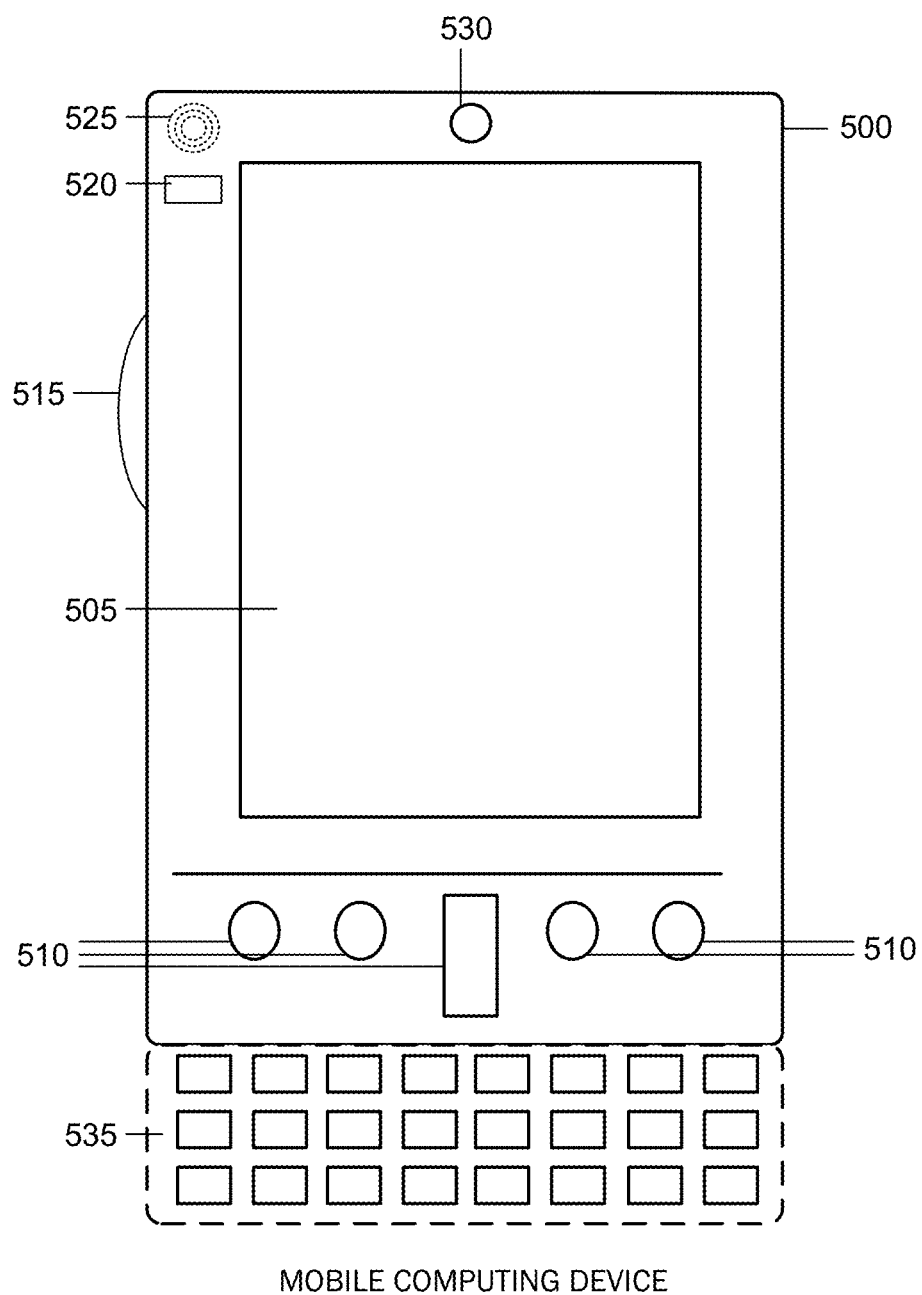
FIGS. 5A and 5B are simplified block diagrams of a mobile computing device with which embodiments of the present invention may be practiced.
Figure 5B:
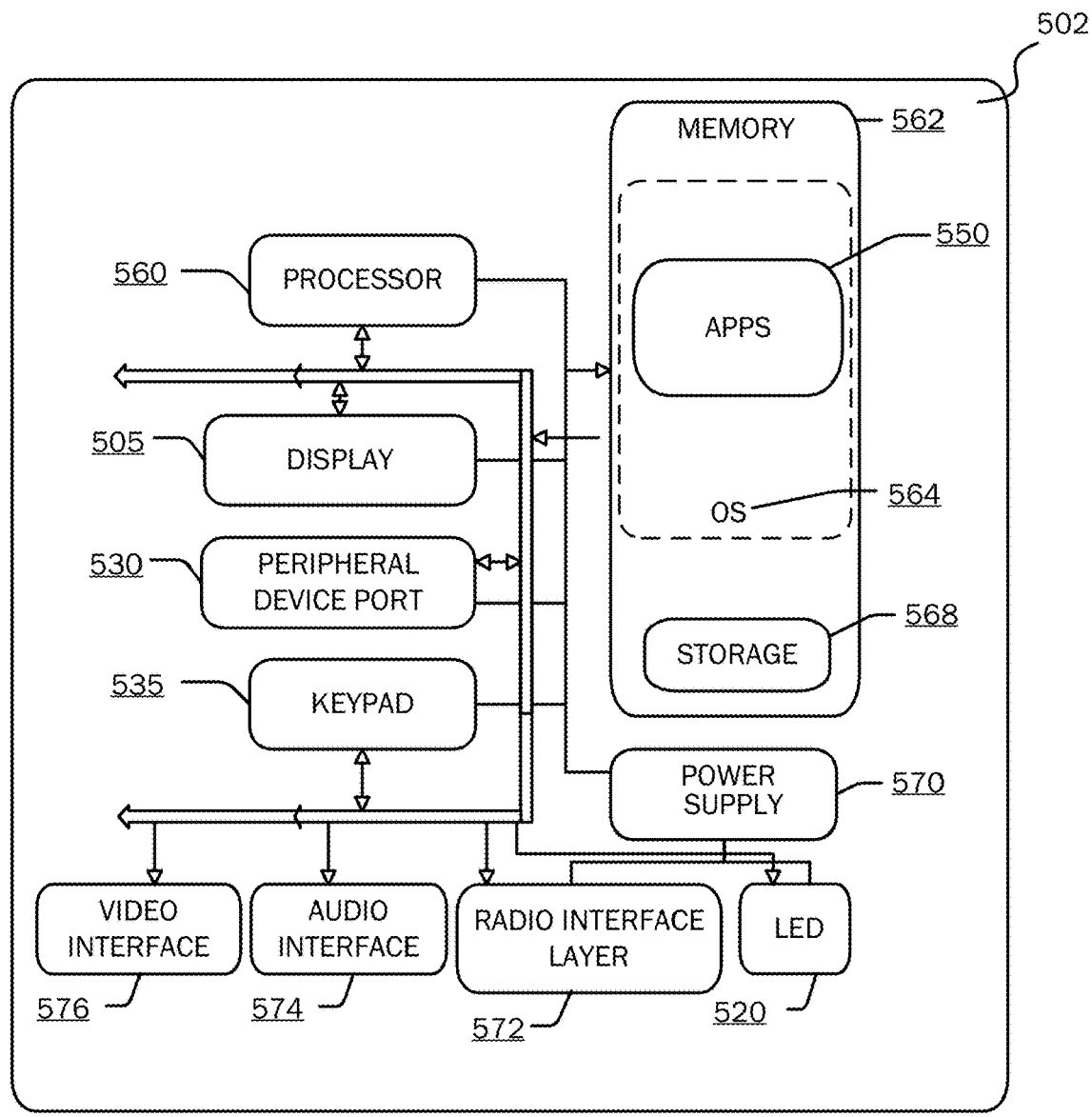
Figure 6:
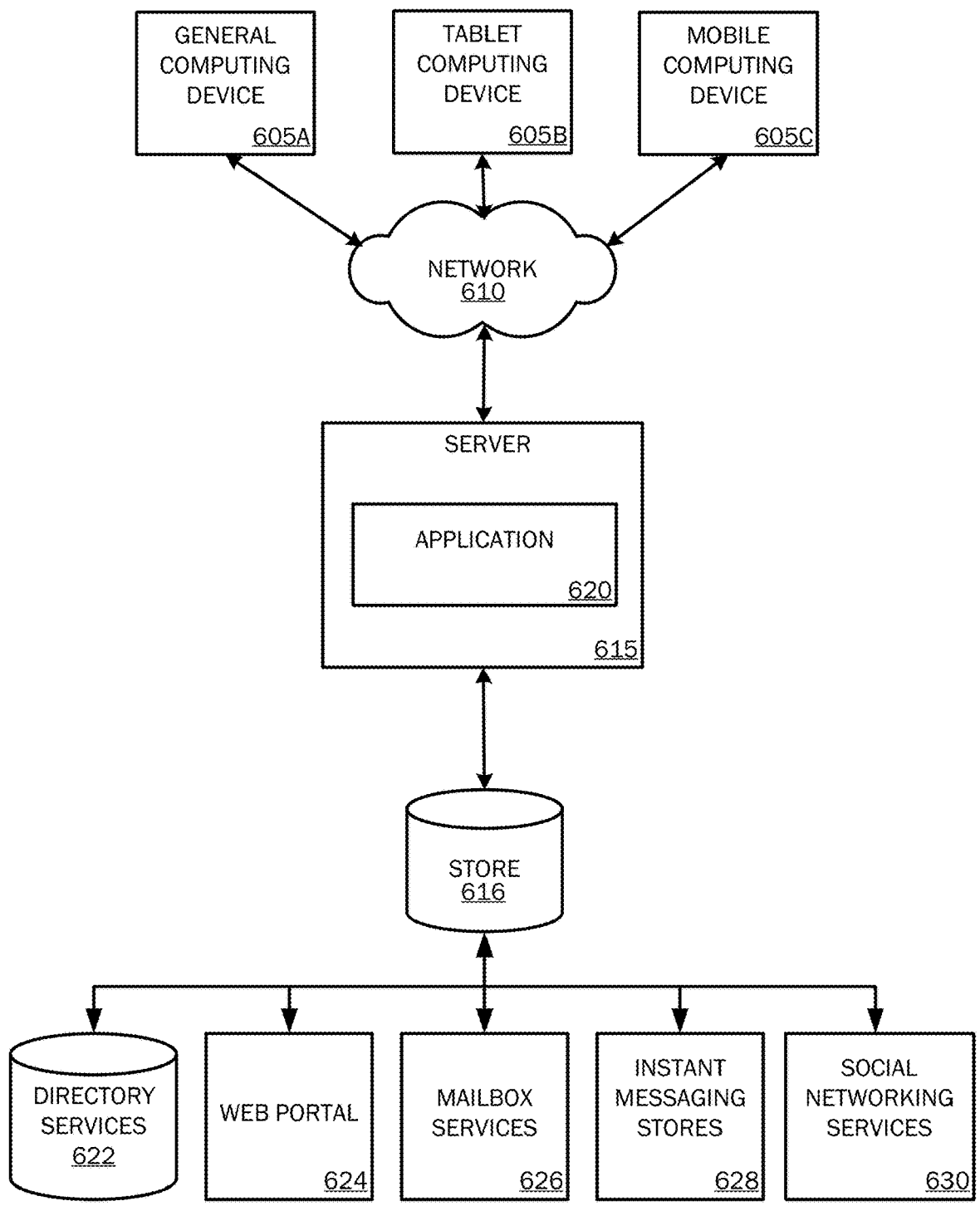
FIG. 6 is a simplified block diagram of a distributed computing system in which embodiments of the present invention may be practiced.

FIGS. 4-6 and the associated descriptions provide a discussion of a variety of operating environments in which embodiments of the invention may be practiced. However, the devices and systems illustrated and discussed with respect to FIGS. 4-6 are for purposes of example and illustration and are not limiting of a vast number of computing device configurations that may be utilized for practicing embodiments of the invention, described herein.

FIG. 4 is a block diagram illustrating physical components (i.e., hardware) of a computing device 400 with which embodiments of the invention may be practiced. The computing device components described below may be suitable for the client device 104a-n described above. In a basic configuration, the computing device 400 may include at least one processing unit 402 and a system memory 404. Depending on the configuration and type of computing device, the system memory 404 may comprise, but is not limited to, volatile storage (e.g., random access memory), non-volatile storage (e.g., read-only memory), flash memory, or any combination of such memories. The system memory 404 may include an operating system 405 and one or more program modules 406 suitable for running software applications 450. The operating system 405, for example, may be suitable for controlling the operation of the computing device 400. Furthermore, embodiments of the invention may be practiced in conjunction with a graphics library, other operating systems, or any other application program and is not limited to any particular application or system. This basic configuration is illustrated in FIG. 4 by those components within a dashed line 408. The computing device 400 may have additional features or functionality. For example, the computing device 400 may also include additional data storage devices (removable and/or non-removable) such as, for example, magnetic disks, optical disks, or tape. Such additional storage is illustrated in FIG. 4 by a removable storage device 409 and a non-removable storage device 410.

As stated above, a number of program modules and data files may be stored in the system memory 404. While executing on the processing unit 402, the program modules 406 may perform processes including, but not limited to, one or more of the stages of the method 300 illustrated in FIG. 3. Other program modules that may be used in accordance with embodiments of the present invention and may include applications such as electronic mail and contacts applications, word processing applications, spreadsheet applications, database applications, slide presentation applications, drawing or computer-aided application programs, etc.

Furthermore, embodiments of the invention may be practiced in an electrical circuit comprising discrete electronic elements, packaged or integrated electronic chips containing logic gates, a circuit utilizing a microprocessor, or on a single chip containing electronic elements or microprocessors. For example, embodiments of the invention may be practiced via a system-on-a-chip (SOC) where each or many of the components illustrated in FIG. 4 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to providing an activity stream across multiple workloads may be operated via application-specific logic integrated with other components of the computing device 400 on the single integrated circuit (chip). Embodiments of the invention may also be practiced using other technologies capable of performing logical operations such as, for example, AND, OR, and NOT, including but not limited to mechanical, optical, fluidic, and quantum technologies. In addition, embodiments of the invention may be practiced within a general purpose computer or in any other circuits or systems.

The computing device 400 may also have one or more input device(s) 412 such as a keyboard, a mouse, a pen, a sound input device, a touch input device, etc. The output device(s) 414 such as a display, speakers, a printer, etc. may also be included. The aforementioned devices are examples and others may be used. The computing device 400 may include one or more communication connections 416 allowing communications with other computing devices 418. Examples of suitable communication connections 416 include, but are not limited to, RF transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 404, the removable storage device 409, and the non-removable storage device 410 are all computer storage media examples (i.e., memory storage.) Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 400. Any such computer storage media may be part of the computing device 400. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

FIGS. 5A and 5B illustrate a mobile computing device 500, for example, a mobile telephone, a smart phone, a tablet personal computer, a laptop computer, and the like, with which embodiments of the invention may be practiced. With reference to FIG. 5A, one embodiment of a mobile computing device 500 for implementing the embodiments is illustrated. In a basic configuration, the mobile computing device 500 is a handheld computer having both input elements and output elements. The mobile computing device 500 typically includes a display 505 and one or more input buttons 510 that allow the user to enter information into the mobile computing device 500. The display 505 of the mobile computing device 500 may also function as an input device (e.g., a touch screen display). If included, an optional side input element 515 allows further user input. The side input element 515 may be a rotary switch, a button, or any other type of manual input element. In alternative embodiments, mobile computing device 500 may incorporate more or less input elements. For example, the display 505 may not be a touch screen in some embodiments. In yet another alternative embodiment, the mobile computing device 500 is a portable phone system, such as a cellular phone. The mobile computing device 500 may also include an optional keypad 535. Optional keypad 535 may be a physical keypad or a "soft" keypad generated on the touch screen display. In various embodiments, the output elements include the display 505 for showing a graphical user interface (GUI), a visual indicator 520 (e.g., a light emitting diode), and/or an audio transducer 525 (e.g., a speaker). In some embodiments, the mobile computing device 500 incorporates a vibration transducer for providing the user with tactile feedback. In yet another embodiment, the mobile computing device 500 incorporates input and/or output ports, such as an audio input (e.g., a microphone jack), an audio output (e.g., a headphone jack), and a video output (e.g., a HDMI port) for sending signals to or receiving signals from an external device.

FIG. 5B is a block diagram illustrating the architecture of one embodiment of a mobile computing device. That is, the mobile computing device 500 can incorporate a system (i.e., an architecture) 502 to implement some embodiments. In one embodiment, the system 502 is implemented as a "smart phone" capable of running one or more applications (e.g., browser, e-mail, calendaring, contact managers, messaging clients, games, and media clients/players). In some embodiments, the system 502 is integrated as a computing device, such as an integrated personal digital assistant (PDA) and wireless phone.

One or more application programs 550 may be loaded into the memory 562 and run on or in association with the operating system 564. Examples of the application programs include phone dialer programs, electronic communication applications, personal information management (PIM) programs, word processing programs, spreadsheet programs, Internet browser programs, messaging programs, and so forth. The system 502 also includes a non-volatile storage area 568 within the memory 562. The non-volatile storage area 568 may be used to store persistent information that should not be lost if the system 502 is powered down. The application programs 550 may use and store information in the non-volatile storage area 568, such as e-mail or other messages used by an e-mail application, and the like. A synchronization application (not shown) also resides on the system 502 and is programmed to interact with a corresponding synchronization application resident on a host computer to keep the information stored in the non-volatile storage area 568 synchronized with corresponding information stored at the host computer. As should be appreciated, other applications may be loaded into the memory 562 and run on the mobile computing device 500.

The system 502 has a power supply 570, which may be implemented as one or more batteries. The power supply 570 might further include an external power source, such as an AC adapter or a powered docking cradle that supplements or recharges the batteries.

The system 502 may also include a radio 572 that performs the function of transmitting and receiving radio frequency communications. The radio 572 facilitates wireless connectivity between the system 502 and the "outside world," via a communications carrier or service provider. Transmissions to and from the radio 572 are conducted under control of the operating system 564. In other words, communications received by the radio 572 may be disseminated to the application programs 550 via the operating system 564, and vice versa.

The visual indicator 520 may be used to provide visual notifications and/or an audio interface 574 may be used for producing audible notifications via the audio transducer 525. In the illustrated embodiment, the visual indicator 520 is a light emitting diode (LED) and the audio transducer 525 is a speaker. These devices may be directly coupled to the power supply 570 so that when activated, they remain on for a duration dictated by the notification mechanism even though the processor 560 and other components might shut down for conserving battery power. The LED may be programmed to remain on indefinitely until the user takes action to indicate the powered-on status of the device. The audio interface 574 is used to provide audible signals to and receive audible signals from the user. For example, in addition to being coupled to the audio transducer 525, the audio interface 574 may also be coupled to a microphone to receive audible input, such as to facilitate a telephone conversation. In accordance with embodiments of the present invention, the microphone may also serve as an audio sensor to facilitate control of notifications, as will be described below. The system 502 may further include a video interface 576 that enables an operation of an on-board camera 530 to record still images, video stream, and the like.

A mobile computing device 500 implementing the system 502 may have additional features or functionality. For example, the mobile computing device 500 may also include additional data storage devices (removable and/or non-removable) such as, magnetic disks, optical disks, or tape. Such additional storage is illustrated in FIG. 5B by the non-volatile storage area 568.

Data/information generated or captured by the mobile computing device 500 and stored via the system 502 may be stored locally on the mobile computing device 500, as described above, or the data may be stored on any number of storage media that may be accessed by the device via the radio 572 or via a wired connection between the mobile computing device 500 and a separate computing device associated with the mobile computing device 500, for example, a server computer in a distributed computing network, such as the Internet. As should be appreciated such data/information may be accessed via the mobile computing device 500 via the radio 572 or via a distributed computing network. Similarly, such data/information may be readily transferred between computing devices for storage and use according to well-known data/information transfer and storage means, including electronic mail and collaborative data/information sharing systems.

FIG. 6 illustrates one embodiment of the architecture of a system for providing the functionality described herein across components of a distributed computing environment. Content developed, interacted with, or edited in association with the applications described above may be stored in different communication channels or other storage types. For example, various documents may be stored using a directory service 622, a web portal 624, a mailbox service 626, an instant messaging store 628, or a social networking site 630. The application 620 (e.g., an electronic communication application) may use any of these types of systems or the like for providing the functionalities described herein across multiple workloads, as described herein. A server 615, 108 may provide the functionality to clients 605A-C and 104A-N. As one example, the server 615, 108 may be a web server providing the application functionality described herein over the web. The server 615, 108 may provide the application functionality over the web to clients 605A-C and 104A-N through a network 140, 610. By way of example, a client computing device 104A-N may be implemented and embodied in a personal computer 605A, a tablet computing device 605B and/or a mobile computing device 605C (e.g., a smart phone), or other computing device. Any of these embodiments of the client computing device may obtain content from the store 616.

Embodiments of the present invention, for example, are described above with reference to block diagrams and/or operational illustrations of methods, systems, and computer program products according to embodiments of the invention. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more embodiments provided in this application are not intended to limit or restrict the scope of the invention as claimed in any way. The embodiments, examples, and details provided in this application are considered sufficient to convey possession and enable others to make and use the best mode of claimed invention. The claimed invention should not be construed as being limited to any embodiment, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate embodiments falling within the spirit of the broader aspects of the general inventive concept embodied in this application that do not depart from the broader scope of the claimed invention.

We claim:

1. A method, comprising:
    in a user interface of an electronic communication application, providing an electronic communication viewing pane in which an electronic communication is displayed, the electronic communication including an attachment;
    receiving a selection of the attachment;
    in response to receiving the selection of the attachment, providing for simultaneous display a content item corresponding to the attachment in a view pane and the electronic communication in the electronic communication viewing pane, wherein the view pane comprises a first control function to edit the displayed content item;
    receiving a selection of the first control function;
    in response to receiving the selection of the first control function:
        launching, in the view pane, an instance of an application corresponding to the displayed content item and providing for display an application functionality control in the view pane for selectively applying a functionality to the displayed content item;
        automatically generating a new electronic communication;
        replacing the electronic communication displayed in the electronic communication viewing pane with the new electronic communication; and
        providing for display, in the electronic communication viewing pane, a function to dispose of the displayed content item;
    receiving an edit to the displayed content item in the view pane through the application functionality control to produce an edited version of the displayed content item;
    receiving a selection of the function to dispose of the displayed content item; and
    in response to receiving the selection of the function to dispose of the displayed content item:
        automatically providing, in the electronic communication viewing pane, an electronic item of a functionality of the electronic communication application that is one of a meeting request, an electronic notes document, a calendar item, an electronic task or an electronic reminder; and
        automatically attaching the edited version of the displayed content item as an attachment to the electronic item.

2. The method of claim 1, further comprising:
    automatically storing, at an electronic communication server associated with the electronic communication application, a temporary copy of the edited version of the displayed content item.

3. The method of claim 2, further comprising:
    applying a filename for the temporary copy that includes an original filename for the displayed content item and a user editing the displayed content item.

4. The method of claim 2, wherein automatically attaching the edited version of the displayed content item as the attachment to the electronic item comprises:
    retrieving, from the electronic communication server, the temporary copy of the edited version of the displayed content item for attachment to the electronic item.

5. The method of claim 1, wherein the function to dispose of the displayed content item is of a first type for attaching the edited version of the displayed content item to the one of the meeting request, the electronic notes document, the calendar item, the electronic task or the electronic reminder.

6. The method of claim 5, the method further comprising:
    providing for display in the electronic communication viewing pane at least a second type of function to dispose of the displayed content item, the second type of function for attaching the edited version of the displayed content item to the new electronic communication for transmission.

7. The method of claim 6, wherein the second type of function is a save and send function.

8. The method of claim 6, further comprising:
    receiving a selection of the second type of function; and
    in response to the selection of the second type of function:

automatically attaching the edited version of the displayed content item to the new electronic communication; and sending the new electronic communication to a provided recipient.

9. The method of claim 8, the method further comprising:
prior to receiving the selection of the second type of function, receiving a text entry in the new electronic communication.

10. The method of claim 1, wherein automatically generating the new electronic communication comprises:
generating a reply electronic communication as the new electronic communication for transmission to an original sender of the electronic communication.

11. The method of claim 1, wherein automatically generating the new electronic communication comprises:
generating a forwarding electronic communication as the new electronic communication for transmission to one or more recipients.

12. A computing device for providing content item editing in an immersive view pane of an electronic communication application user interface, the computing device comprising:
a processor; and
a memory coupled to the processor, the memory storing instructions that, when executed by the processor, cause the computing device to:
in a user interface of an electronic communication application, provide an electronic communication viewing pane in which an electronic communication is displayed, the electronic communication including an attachment;
receive a selection of the attachment;
in response to receiving the selection of the attachment, provide for simultaneous display a content item corresponding to the attachment in a view pane and the electronic communication in the electronic communication viewing pane, wherein the view pane comprises a first control function to edit the displayed content item;
receive a selection of the first control function;
in response to receiving the selection of the first control function:
launch, in the view pane, an instance of an application corresponding to the displayed content item and provide for display an application functionality control in the view pane for selectively applying a functionality to the displayed content item;
automatically generate a new electronic communication;
replace the electronic communication displayed in the electronic communication viewing pane with the new electronic communication; and
provide for display, in the electronic communication viewing pane, a function to dispose of the displayed content item;
receive an edit to the displayed content item in the view pane through the application functionality control to produce an edited version of the displayed content item;
receive a selection of the function to dispose of the displayed content item; and
in response to receiving the selection of the function to dispose of the displayed content item:
automatically provide, in the electronic communication viewing pane, an electronic item of a functionality of the electronic communication application that is one of a meeting request, an electronic notes document, a calendar item, an electronic task or an electronic reminder; and
automatically attach the edited version of the displayed content item as an attachment to the electronic item.

13. The computing device of claim 12, wherein the instructions further cause the computing device to:
automatically store, at an electronic communication server associated with the electronic communication application, a temporary copy of the edited version of the displayed content item, wherein the temporary copy is stored in association with the electronic communication.

14. The computing device of claim 13, wherein the instructions further cause the computing device to:
receive a selection to transmit the new electronic communication; and
in response to the selection to transmit the new electronic communication:
retrieve, from the electronic communication server, the temporary copy of the edited version of the displayed content item;
attach the edited version of the displayed content item as an attachment to the new electronic communication; and
send the new electronic communication to a provided recipient.

15. The computing device of claim 14, wherein the instructions further cause the computing device to:
prior to receiving the selection to transmit the new electronic communication, receive a text entry in the new electronic communication; and
send the new electronic communication with the text entry and the attachment to the provided recipient.

16. The computing device of claim 12, wherein to automatically generate the new electronic communication, the instructions cause the computing device to one of:
generate a reply electronic communication as the new electronic communication for transmission to an original sender of the electronic communication; and
generate a forwarding electronic communication as the new electronic communication for transmission to one or more recipients.

17. The computing device of claim 12, wherein the electronic communication is of a communication type belonging to one or more of an electronic communication, a text message communication, a chat session communication, an instant messaging communication, a video communication, an electronic calendar item, an electronic task item, and an electronic reminder item.

18. The computing device of claim 12, wherein the application corresponding to the displayed content item is one or more of a word processing application, a spreadsheet application, a slide presentation application, a notes taking application, a desktop publishing application, a calendar application, a tasks application and a reminders application.

19. Computer storage media containing computer executable instructions, which when executed by a processor perform a method for providing content item editing in an immersive view pane of an electronic communication application user interface, the method comprising:
in a user interface of an electronic communication application, providing an electronic communication viewing pane in which an electronic communication is displayed, the electronic communication including an attachment;
receiving a selection of the attachment;

in response to receiving the selection of the attachment, providing for simultaneous display a content item corresponding to the attachment in a view pane and the electronic communication in the electronic communication viewing pane, wherein the view pane comprises a first control function to edit the displayed content item;

receiving a selection of the first control function;

in response to receiving the selection of the first control function:
- launching, in the view pane, an instance of an application corresponding to the displayed content item and providing for display an application functionality control in the view pane for selectively applying a functionality to the displayed content item;
- automatically generating a new electronic communication;
- replacing the electronic communication displayed in the electronic communication viewing pane with the new electronic communication; and
- providing for display, in the electronic communication viewing pane, a function to dispose of the displayed content item;

receiving an edit to the displayed content item in the view pane through the application functionality control to produce an edited version of the displayed content item;

receiving a selection of the function to dispose of the displayed content item; and in response to receiving the selection of the function to dispose of the displayed content item:
- automatically providing, in the electronic communication viewing pane, an electronic item of a functionality of the electronic communication application that is one of a meeting request, an electronic notes document, a calendar item, an electronic task or an electronic reminder; and
- automatically attaching the edited version of the displayed content item as an attachment to the electronic item.

20. The computer storage media of claim 19, the method further comprising:

receiving a selection to transmit the new electronic communication; and in response to the selection to transmit the new electronic communication:
- attaching the edited version of the displayed content item as an attachment to the new electronic communication; and
- sending the new electronic communication to a provided recipient.

* * * * *